United States Patent
Walters

(10) Patent No.: US 9,756,459 B1
(45) Date of Patent: Sep. 5, 2017

(54) IFINDER SYSTEMS

(71) Applicant: James Walters, Cloverdale, CA (US)

(72) Inventor: James Walters, Cloverdale, CA (US)

( * ) Notice: Subject to any disclaimer, the term of this patent is extended or adjusted under 35 U.S.C. 154(b) by 0 days.

(21) Appl. No.: 14/605,233

(22) Filed: Jan. 26, 2015

Related U.S. Application Data

(60) Provisional application No. 61/932,067, filed on Jan. 27, 2014.

(51) Int. Cl.
| | |
|---|---|
| *H04W 24/00* | (2009.01) |
| *H04W 4/02* | (2009.01) |
| *H04L 29/08* | (2006.01) |
| *H04M 3/51* | (2006.01) |
| *H04M 1/725* | (2006.01) |
| *G08B 21/24* | (2006.01) |

(52) U.S. Cl.
CPC .............. *H04W 4/02* (2013.01); *G08B 21/24* (2013.01); *H04L 67/306* (2013.01); *H04M 1/72527* (2013.01); *H04M 1/72572* (2013.01); *H04M 3/5183* (2013.01)

(58) Field of Classification Search
USPC .............................. 455/456, 435.1; 370/328
See application file for complete search history.

(56) References Cited

U.S. PATENT DOCUMENTS

| | | | |
|---|---|---|---|
| 6,580,909 B1 * | 6/2003 | Carro | H04W 60/00 455/435.1 |
| 7,821,391 B2 | 10/2010 | Gupta | |
| 7,898,414 B2 | 3/2011 | Spano | |
| 8,044,796 B1 | 10/2011 | Carr, Sr. | |
| 2010/0191413 A1 * | 7/2010 | Fritsch | G01P 1/122 701/29.2 |
| 2011/0228727 A1 * | 9/2011 | Julo | G01S 19/16 370/328 |

FOREIGN PATENT DOCUMENTS

WO    WO 2009055874 A1 *    5/2009    ............ G01S 19/14

* cited by examiner

*Primary Examiner* — David Q Nguyen
(74) *Attorney, Agent, or Firm* — RG Patent Consulting, LLC; Rachel Gilboy

(57) ABSTRACT

A GPS tracking device and/or application for smart phones, tablets and portable computers, which uses a system of tags and a monitoring center that serve as a physical asset tracking and location management system of personal items, devices, automobiles, pets and people to provide a way to track and retrieve personal items and loved ones, as well as prevent theft or loss.

18 Claims, 6 Drawing Sheets

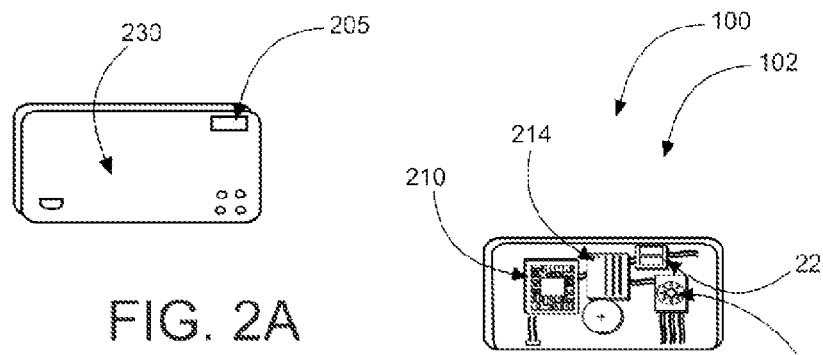
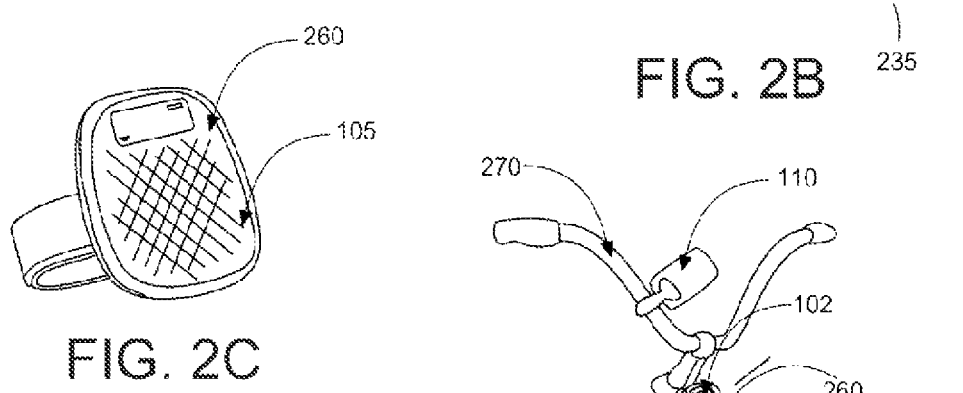
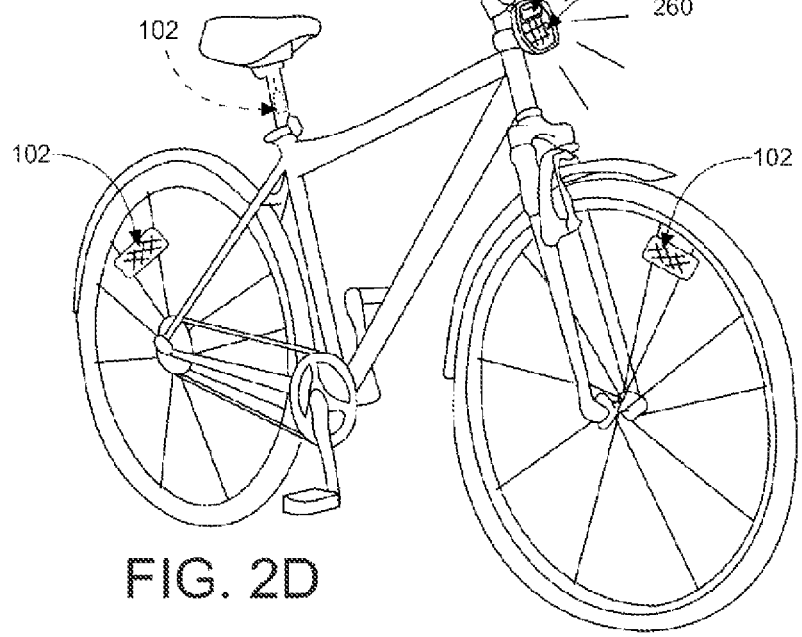

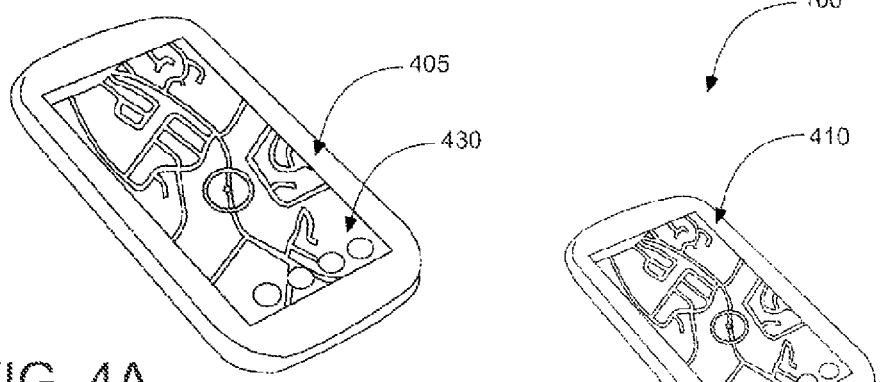
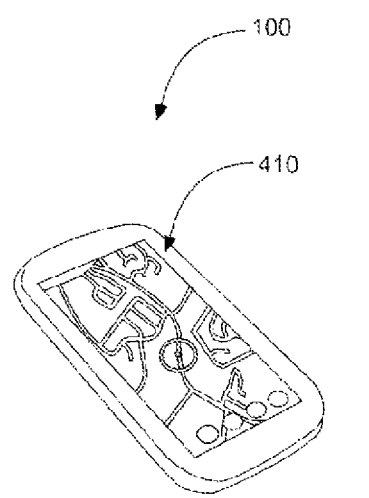
FIG. 4A
FIG. 4B
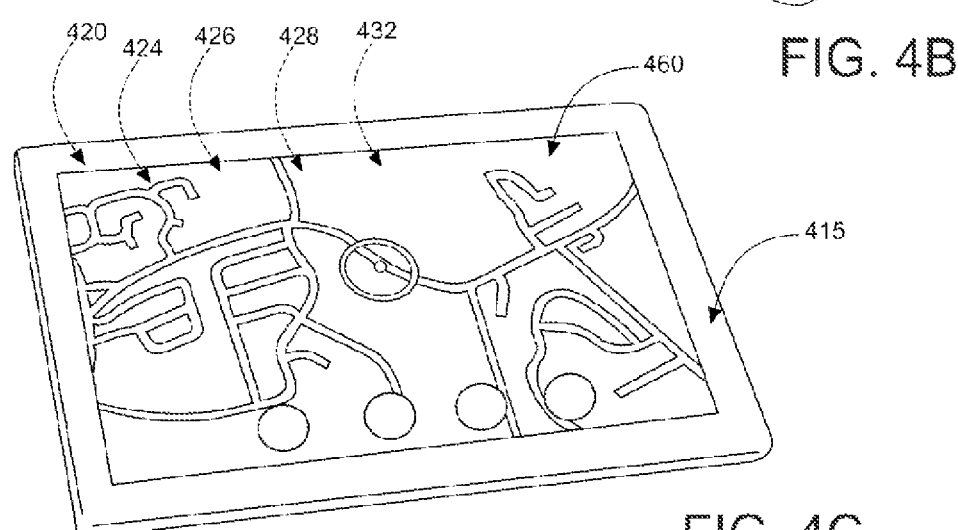
FIG. 4C
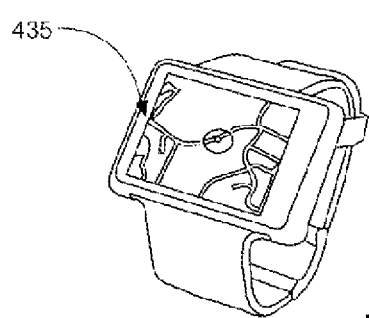
FIG. 4D

IFINDER SYSTEMS

CROSS-REFERENCE TO RELATED APPLICATION

The present application is related to and claims priority from prior provisional application Ser. No. 61/932,067, filed Jan. 27, 2014 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of GPS locator devices and more specifically relates to a Slave Hidden Lockable GPS Tracking Device System.

2. Description of the Related Art

Keeping proper track of one's regularly used assets and other cherished items is an important part of enjoying a stress-free lifestyle. It is difficult to really relax or enjoy ourselves when constantly struck by worry over misplaced or perhaps even stolen items. These types of fears can make it very difficult for an individual to focus on any of the other, important aspects of life that are generally required in the pursuit of happiness.

Anxiety relating to lost, misplaced and stolen items is a considerable burden for many people to bear. The world offers very little recourse for those whose big-ticket purchases like solar panels, boat trailers and skidoos are rudely removed from their care. It is likewise harshly inconsiderate of those who are unable to keep constant track of their loved ones' whereabouts. Once someone or something is lost, it's too late to think about what types of safety measures may have been employed to protect against such a disquieting outcome.

Modern developments in location tracking and item cataloging have helped us reach a state where we need no longer fear for the irretrievable loss of our prized possessions and important people. The Global Positioning System, a satellite relay network operated on behalf of the United States government, broadcasts a universal and freely accessible signal which can be used to precisely triangulate the relative earthly position of any object or point in space. The widespread consumer utilization of this wonderful service is starting to see its first, tentative stirrings in the field of automobile and pleasure craft navigation, where GPS-based devices already offer considerable location and direction-finding assistance.

Recent advances in microcircuitry and smart chip design, however, have opened the avenues for newer and even more powerful applications of this ubiquitous technology. The rapidly shrinking size of consumer electronics ensures that systems can now be built which use the GPS signal not merely to identify locations, but also to report and co-ordinate that location information for more effective end-user access.

Various attempts have been made to solve the above-mentioned problems such as those found in U.S. Pat. No. 8,044,796 to Syd K. Carr, Sr.; U.S. Pat. No. 7,898,414 to Michael J. Spano; and U.S. Pat. No. 7,821,391 to Vikram Makam Gupta et al. This prior art is representative of GPS locator devices. None of the above inventions and patents, taken either singly or in combination, is seen to describe the invention as claimed.

Ideally, an iFinder System, should provide a user with a handy and convenient means for locating misplaced objects, and, yet would operate reliably and be manufactured at a modest expense. A need exists for a reliable iFinder, a GPS tracking device and/or application for smart phones, tablets and portable computers, which uses a system of tags and a monitoring center that serve as a physical asset tracking and location management system of personal items, devices, automobiles, pets and people to provide a way to track and retrieve personal items and loved ones, as well as prevent theft or loss and to avoid the above-mentioned problems.

BRIEF SUMMARY OF THE INVENTION

In view of the foregoing disadvantages inherent in the known GPS locator device art, the present invention provides a novel iFinder (also referred to as an object tracking and discovery fleet system and also referred to as a "Slave Hidden Lockable GPS Tracking Device"). The general purpose of the present invention, which will be described subsequently in greater detail, is to provide a GPS tracking device and/or application for smart phones, tablets and portable computers, which may comprise a system of tags and a monitoring center for physical asset tracking and location management system of personal items, as well as prevent theft or loss.

A preferred embodiment of an object tracking and discovery fleet system is disclosed herein comprising at least one slave-tag assembly, at least one master device, and a remote monitoring center. The slave-tag assembly may comprise a housing having an inconspicuous profile, at least one housing-attacher, at least one microcontroller, at least one tracking unit comprising a unique identifier, at least one wireless transmitter and transceiver, and at least one power source. The master device may comprise a microprocessor, a display screen, a wireless communication unit, an alarm and speaker unit, at least one memory device, a map application, a plurality of control buttons, and at least one power supplier. The remote monitoring center comprises a real-time monitoring center that may be in regular remote communication with the at least one slave-tag assembly and the at least one master device. It should be noted that the slave-tag assembly, the master device, and the remote monitoring center comprises in functional combination the object tracking and discovery fleet system.

With reference to the slave-tag assembly, the microcontroller, the tracking unit comprises the unique identifier, the wireless transmitter and transceiver, and the power source may be securely mounted inside an interior volume of the housing. The housing-attacher may be useful for attaching the housing comprising the inconspicuous profile to a user-desired object. The microcontroller may be in wired communication with the tracking unit, the wireless transmitter and transceiver, and the power source. The tracking unit may be structured and arranged for detecting a precise location of the slave-tag assembly and communicating the precise location to the microcontroller. The unique identifier may comprise a unique identification signal for distinguishing the slave-tag assembly from another the slave-tag assembly. The wireless transmitter and transceiver may be structured and arranged to wirelessly transmit the precise location and the unique identification signal comprising the unique identifier to the wireless communication unit of the master device. The power source may provide operating power to the slave-tag assembly.

With continued reference to the slave-tag assembly, the housing having the inconspicuous profile may comprise a hard, injection-molded plastic shell for protecting integral components of the at least one slave-tag assembly. The tracking unit may comprise a global position satellite chip for pinpointing the precise location via the map application of the at least one master device. Further, the slave-tag assembly may comprise an alarm structured and arranged to emit a noise upon receipt of a call signal transmitted by the at least one master device. In addition, the at least one slave-tag assembly further may comprise at least one LED structured and arranged to pulsate upon receipt of the call signal transmitted by the at least one master device.

In one embodiment of the object tracking and discovery fleet system, the housing of the at least one slave-tag assembly may comprise dimensions of approximately 1" by 2" useful for clipping the housing onto the-desired object having smaller dimensions. In another embodiment of the object tracking and discovery fleet system, the housing of the at least one slave-tag assembly may comprise dimensions of approximately 3" by 6" useful for clipping the housing onto the-desired object having larger dimensions.

With particular reference to the master device, the microprocessor may be in wired communication with the display screen, the wireless communication unit, the alarm and speaker unit, the plurality of control buttons, and the power supplier. The display screen may be useful for displaying the precise location of the slave-tag assembly via the map application of the master device. The alarm and speaker unit may be structured and arranged to emit an audible alarm. The memory device may be structured and arranged to store data file. The touch display may be structured and arranged to allow a user to input programmable command(s) into the master device such that the programmable commands are receivable by the microprocessor. The power supplier may be useful for providing operating power to the master device. During use, the master device may be able to transmit a call signal from the wireless communication unit to the wireless transmitter and transceiver for tracking and locating the user-desired object if misplaced by the user. It should be appreciated that the object tracking and discovery fleet system may be useful for locating a plurality of the user-desired trackable object(s) via one or more master devices as commanded by the user to save time and minimize stress involved in spending time looking for misplaced items of importance.

In one embodiment of the present invention, the master device may comprise an iFinder. The iFinder may comprise a mobile electronic device, similar in appearance to a smartphone, useful for syncing, monitoring, tracking, and locating a plurality of user-desired object(s), each user-desired object removably-attached to a distinct slave-tag assembly via at least one housing attacher. The iFinder may comprise a LCD touch display screen. The LCD touch display screen may act as a user-inputter for communicating and operating the iFinder.

In another embodiment of the present invention, the master device may comprise an iFinder mini. The iFinder mini may comprise a smaller mobile electronic device useful for syncing, monitoring, tracking, and locating a plurality of user-desired object(s), each user-desired object removably-attached to a distinct slave-tag assembly via at least one housing attacher. Preferably, the iFinder mini may comprise a keyring hole and ring for clipping to a keyring of the user.

In other embodiments, the iFinder mini may comprise a solid body not having the keyring hole. The display screen of the iFinder mini may comprise a LCD touch display screen. The LCD touch display screen may act as a user-inputter for communicating and operating the iFinder mini.

In still another embodiment of the present invention, the master device may comprise a larger iFinder. The larger iFinder comprise a larger mobile electronic device, similar in appearance to a tablet, useful for syncing, monitoring, tracking, and locating a plurality of user-desired object(s), each user-desired object removably-attached to a distinct slave-tag assembly via at least one housing attacher. The larger iFinder may comprise a LCD touch display screen. The LCD touch display screen may act as a user-inputter for communicating and operating the larger iFinder.

In yet another embodiment of the present invention, the master device may comprise a wrist-worn device useful for tracking and locating the at least one slave-tag assembly. The wrist-worn device, similar in appearance to a watch, may be useful for tracking objects in a convenient manner via the wrist-worn device which may be worn about a wrist of the user. It should be noted the wrist-worn device may comprise an adjustable band for fitting various sized wrists. The adjustable band may be manufactured and distributed in a variety of colors and designs based on consumer appeal.

Further, the master device may comprise a user-provided mobile electronic device (such as a laptop computer, a smartphone, a tablet, or the like). In such a manner, a mobile device software application of the object tracking and discovery fleet system may be downloaded and installed onto the at least one user-provided mobile communication device. The mobile device software application may be useful for syncing, monitoring, and tracking the at least one slave-tag assembly using the user-provided mobile electronic device.

In still referring to the preferred embodiment of the object tracking and discovery fleet system comprises a color code. The color code may be useful for visually indicating a real-time status of the at least one slave-tag assembly. The color code may comprise a blue color. The blue color may be useful for indicating the real-time status comprising a locked-secured condition of the slave-tag assembly. The color code may further comprise a green color useful for indicating an in-use condition of the slave-tag assembly. In addition, the color code may further comprise a red color useful for indicating a stolen condition of the slave-tag assembly.

The remote monitoring center may comprise an around-the-clock real-time computer and human operating monitoring facility useful for providing a 24/7 phone and internet help center to assist the user in tracking and locating user-desired object(s) having the slave-tag assembly attached thereto. The user is able create a user account with the remote monitoring center for real-time tracking of the at least one slave-tag assembly(ies) belonging to the user. The remote monitoring center may be structured and arranged to receive a real-time communication from the user such that the user is able to communicate the unique identifier of the at least one slave-tag assembly to the remote monitoring center for registering and tracking the at least one slave-tag assembly(ies). The real-time communication may comprise a telephonic communication such that the user is able to telephonically communicate with the remote monitoring center and the real-time communication comprises a wireless connection such that the user is able wirelessly communicate with the remote monitoring center.

A kit for selling and distributing the object tracking and discovery fleet system may comprise at least one slave-tag assembly, at least one master device (such as the iFinder, the iFinder mini, or the large iFinder, a mobile device application software program, and a set of user instructions.

A method of using an object tracking and discovery fleet system comprises the steps of: step one, clipping a housing of at least one slave-tag assembly to a user-desired object via at least one housing-attacher; step two, syncing a unique identifier of the at least one slave-tag assembly with at least one master device; and step three, monitoring the at least one slave-tag assembly via the at least one master device.

The method of using the object tracking and discovery fleet system comprises the optional steps of: step four, registering a user account with a remote monitoring center, and step five, communicating with the remote monitoring center to track and locate at least one slave-tag assembly during use.

The present invention holds significant improvements and serves as a novel misplaced object discovery device and system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, object tracking and discovery fleet systems (also known as "iFinder"), constructed and operative according to the teachings of the present invention.

FIG. 2A is a perspective view illustrating an embodiment of the slave-tag assembly comprising a housing having an inconspicuous profile and having dimensions of approximately 1" by 2" according to an embodiment of the present invention of FIG. 1.

FIG. 2B is an interior-perspective view of the slave-tag assembly comprising a microcontroller, a tracking unit comprising a unique identifier, a wireless transmitter and transceiver, and a power source according to an embodiment of the present invention of FIG. 2A.

FIG. 2C is a perspective view of the slave-tag assembly discretely attached to a bicycle reflector according to an embodiment of the present invention of FIGS. 2A and 2B.

FIG. 2D is a perspective view of a bicycle having the bicycle reflector comprising the slave-tag assembly installed thereto for inconspicuously tracking the user-desired object comprising the bicycle according to an embodiment of the present invention of FIG. 2C.

FIG. 4A is a perspective view illustrating a master device of the object tracking and discovery fleet system comprising an iFinder according to an embodiment of the present invention.

FIG. 4B is a perspective view illustrating the master device of the object tracking and discovery fleet system comprising an iFinder mini according to an embodiment of the present invention FIG. 4C is a perspective view illustrating the master device of the object tracking and discovery fleet system comprising a large iFinder according to an embodiment of the present invention.

FIG. 4D is a perspective view illustrating the master device of the object tracking and discovery fleet system comprising an iFinder watch according to an embodiment of the present invention.

The various embodiments of the present invention will hereinafter be described in conjunction with the appended drawings, wherein like designations denote like elements.

DETAILED DESCRIPTION

Figure 1:
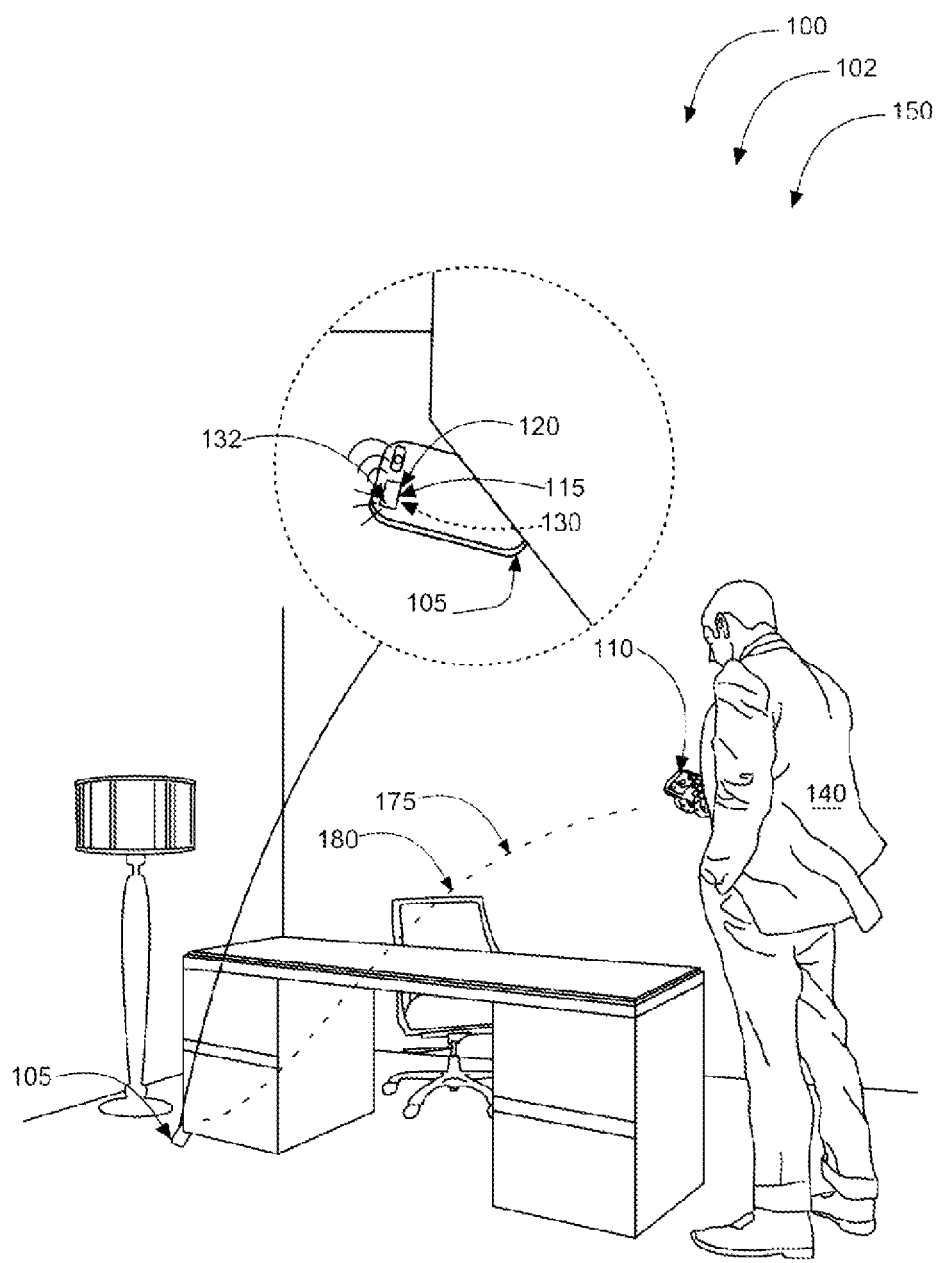
FIG. 1 shows a perspective view illustrating an object tracking and discovery fleet system during an 'in-use' condition showing a user tracking and locating a user-desired object having at least one slave-tag assembly secured thereto via at least one master device according to an embodiment of the present invention.

As discussed above, embodiments of the present invention relate to a GPS locator device and more particularly to an iFinder (otherwise referred to as an object tracking and discovery fleet system), a GPS tracking device and/or application for smart phones, tablets and portable computers, which uses a system of tags and a monitoring center that serve as a physical asset tracking and location management system of personal items, devices, automobiles, pets and people to provide a way to track and retrieve personal items and loved ones, as well as prevent theft or loss.

Generally speaking, the object tracking and discovery fleet system may comprise a collection of iFinder locator tags. These "slave" tags may be produced in two different sizes, a 1-inch by 2-inch keychain-sized tag, and a larger 3-inch by 6-inch model for use in situations where more space is available. Each of these tags may be fabricated from a hard, injection-molded plastic shell protecting an inner agglomeration of assorted circuitry designed to interface with the GPS radio waves and display the resultant information on a tiny LCD screen. The circuitry also broadcasts a wireless identification signal consisting of the tag's unique identifier code, along with its current location information.

Other circuits detect incoming broadcasts of a similar nature from within range and add the associated location information for those remote tags to the displayed information on the device's screen. In this manner, each device in operation may be aware of all the others in the same vicinity, and any nodal point on the network is capable of identifying and relaying the location information of any other device.

Thus, the greater the number of locator tags deployed, the more robust a patchwork network they create and the easier it becomes for the user to determine the location coordinates of any of the registered devices in the system. The locator tags may be incorporated into wearable products such as clothing, bracelets, necklaces and more. This would be appropriate for the iFinder Family Plan for use in tracking children and adults. Consumers could set the device to sound off when a child or adult has traveled up to 50 yards away and anywhere in between. An iFinder Wrist Watch may also be produced for this purpose, and would feature turn by turn navigation, and a panic button to summon police. In addition, an iFinder monitoring center would be affiliated with use of this product. The monitoring center could summon help for the user as well.

In addition to the physical tagging devices, the iFinder system may utilize a specialized online application software for relaying tag location information back to the user in the absence of any available tagging device. This type of improved access to the system may be sold to users in tiers, with, perhaps, one monthly cost for tagging one or two devices, and more expensive tiers allowing users to track greater numbers of tags. This may provide users with a convenient way to implement the tags as needed, without having to incur the added cost of an extra tag for use simply as a monitor to track the tags deployed in the field. The compact nature of the tags, and their reliable battery-powered operation, ensures that they may easily be secreted about the superstructure of items being protected from theft, or ensconced about the person of those people the user is trying to keep appropriate track of.

Using an iFinder is a relatively simple affair. First an iFinder device in the appropriate size may be secured to an object. Once the identifying flag has been set, the device may be affixed to the person or object which it is supposed to track. Once the device is placed, the user may secure a second device on which to view the broadcast location information, or else subscribe to the iFinder web service application and monitor the location of the tag via a cloud-based interface. In this manner, fleets of many hundred different and unique tags may be used to maintain complete and accurate records of their various locations over time.

The present invention may therefore provide a quick and effective way to secure one's most important people and belongings against accidental loss or intentional theft and kidnapping. It makes the power of GPS location available for regular users, at a fraction of the cost associated with regular homing device products.

Referring to the drawings by numerals of reference there is shown in FIG. 1, object tracking and discovery fleet system 100 during 'in-use' condition 150 showing user 140 tracking and locating user-desired object 105 having slave-tag assembly 102 secured thereto according to an embodiment of the present invention. As shown, user 140 is able to transmit call signal 175 using master device 110 for tracking and locating user-desired object 105 having slave-tag assembly 102 comprising unique identification signal 180. Upon activation and transmission of call signal 175, slave-tag assembly 102 may emit a loud alarm sound from alarm 120 to audibly indicate a location of user-desired object 105 during a search.

In continuing to refer to FIG. 1, object tracking and discovery fleet system 100 may generally comprise slave-tag assembly 102, master device 110, and remote monitoring center 504. Slave-tag assembly 102 may comprise housing 115 having an inconspicuous profile, housing-attacher 116, microcontroller 210, tracking unit 220 comprising unique identifier 205, wireless transmitter and transceiver 214, and power source 235. Master device 110 may comprise microprocessor 420, display screen 422, wireless communication unit 424, alarm and speaker unit 426, memory device 428, software for map application 460, touch display 430, and power supplier 432. Remote monitoring center 504 may comprise a real-time monitoring center that may be in regular remote communication with slave-tag assembly 102 and master device 110. It should be noted that slave-tag assembly 102, master device 110, and remote monitoring center 504 comprises in functional combination object tracking and discovery fleet system 100.

Referring now to FIGS. 2A and 2B, a perspective view illustrating 1" by 2" model 200 of slave-tag assembly 102 comprising housing 115 and having dimensions of approximately 1" by 2" according to an embodiment of the present invention of FIG. 1. As shown, slave-tag assembly 102 may comprise housing 115. Microcontroller 210, tracking unit 220 comprises unique identifier 205, wireless transmitter and transceiver 214, and power source 235 may be securely mounted inside an interior volume of housing 115. Housing-attacher 116 may be useful for attaching housing 115 comprising an inconspicuous profile to user-desired object 105. Microcontroller 210 may be in wired communication with tracking unit 220, wireless transmitter and transceiver 214, and power source 235. Tracking unit 220 may be structured and arranged for detecting a precise location of slave-tag assembly 102 and communicating the precise location to microcontroller 210.

Unique identifier 205 may comprise unique identification signal 180 for distinguishing slave-tag assembly 102 from another slave-tag assembly 102. Wireless transmitter and transceiver 214 may be structured and arranged to wirelessly transmit the precise location and unique identification signal 180 comprising unique identifier 205 to wireless communication unit 424 of master device 110. Power source 235 may provide operating power to slave-tag assembly 102.

With continued reference to slave-tag assembly 102, housing 115 may comprise plastic shell 230 which may comprise a hard, injection-molded plastic shell for protecting integral components of slave-tag assembly 102. Tracking unit 220 may comprise GPS chip 222 for pinpointing the precise location via map application 460 of master device 110. Further, slave-tag assembly 102 may comprise alarm 120 structured and arranged to emit a noise upon receipt of call signal 175 transmitted by master device 110. In addition, slave-tag assembly 102 further may comprise LED 130 structured and arranged to pulsate for visually displaying pulsating light 132 upon receipt of call signal 175 transmitted by master device 110.

In 1" by 2" model 200 of object tracking and discovery fleet system 100 as shown in FIGS. 2A and 2B, housing 115 of slave-tag assembly 102 may comprise dimensions of approximately 1" by 2". It should be noted that 1" by 2" model 200 may be useful for clipping housing 115 onto user-desired object 105 having a smaller shape dimensions.

FIG. 2B is an interior-perspective view of the slave-tag assembly comprising microcontroller 210, tracking unit 220 comprising unique identifier 205, wireless transmitter and transceiver 214, and power source 235 according to an embodiment of the present invention of FIG. 2A.

Referring now to FIG. 2C is a perspective view of slave-tag assembly 102 discretely attached to bicycle reflector 260 according to an embodiment of the present invention of FIGS. 2A and 2B. As shown, housing 115 of slave-tag assembly 102 may be fixedly attached to bicycle reflector 260 via housing attacher 116.

In one embodiment, housing attacher 116 may comprise a hook-and-loop fastener, such as Velcro®. In other embodiments, housing attacher 116 may comprise a magnetic coupler. Yet in other embodiments, housing attacher 116 may comprise an adhesive or the like. Further, housing attacher 116 may comprise spring-loaded clips, clip-fasteners, male-female snap buttons, or clamping mechanisms.

Referring now to FIG. 2D showing a perspective view of bicycle 270 having the bicycle reflector 260 comprising slave-tag assembly 102 installed thereto for inconspicuously tracking user-desired object 105 comprising bicycle 270 according to an embodiment of the present invention of FIG. 2C. As shown, slave-tag assembly 102 may be all-together "hidden from view" as concealed by bicycle reflector 260. In such a manner, an unauthorized user of bicycle 270 would be unaware of tracking unit 220 of slave-tag assembly 102 such that user 140 who is authorized is able to track slave-tag assembly 102 using master device 110 (as shown and described in more details in FIGS. 4A-4D).

It should be noted that housing 115 of slave-tag assembly 102 may be fixedly mounted to a handlebar or headlight of bicycle 270 for inconspicuous concealment of slave-tag assembly 102 during use. Alternatively, housing 115 of slave-tag assembly 102 may be fixedly mounted to a rim of bicycle 270 for inconspicuous concealment of slave-tag assembly 102 and tracking of bicycle 270.

It should be noted that user-desired object 105 comprising bicycle 270 is one particular example of user-desired object 105 which may be tracked by user 140 in an inconspicuous manner. Housing 115 of slave-tag assembly 102 may be mounted to user-desired object 105 comprising a motorcycle or other motorized two-wheel vehicle. Further, housing 115 of slave-tag assembly 102 may be mounted to user-desired object 105 comprising a motor vehicle (such as a car, a taxi, a limousine, a truck, a bus, a van, or the like). In such a manner, user 140 may keep track of bicycle 270, cars, and other vehicles which may be faster to move (and therefore steal) because they are all modes of transportation.

In another embodiment, housing 115 of slave-tag assembly 102 may comprise a cigarette lighter. In such a manner, the cigarette lighter may conceal tracking unit 220 of slave-tag assembly 102 for tracking user-desired object 105 where the cigarette lighter may be regularly located (such as a motor vehicle).

Figure 3A:
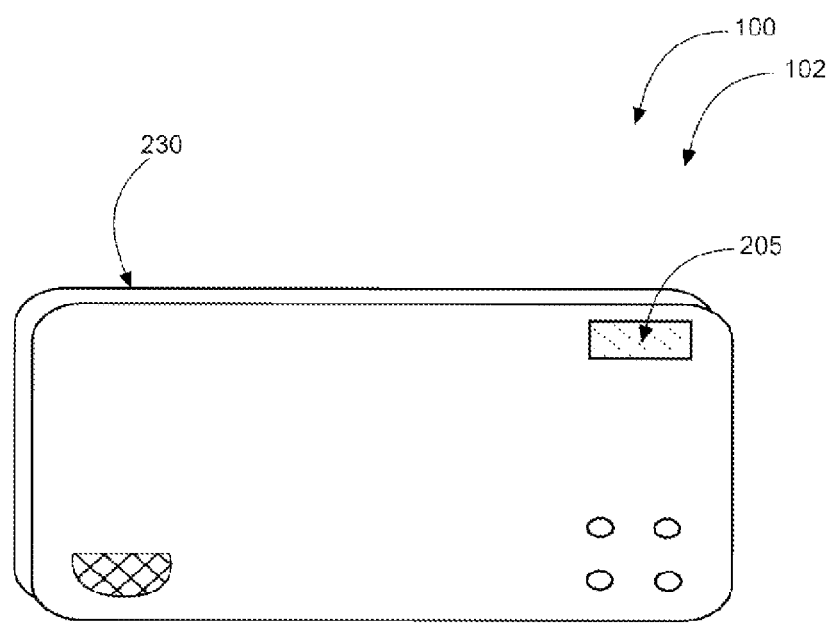
FIG. 3A is a perspective view illustrating an alternative embodiment of the slave-tag assembly comprising the housing having the inconspicuous profile and having dimensions of approximately 3" by 6" according to an embodiment of the present invention of FIG. 1.
Figure 3B:
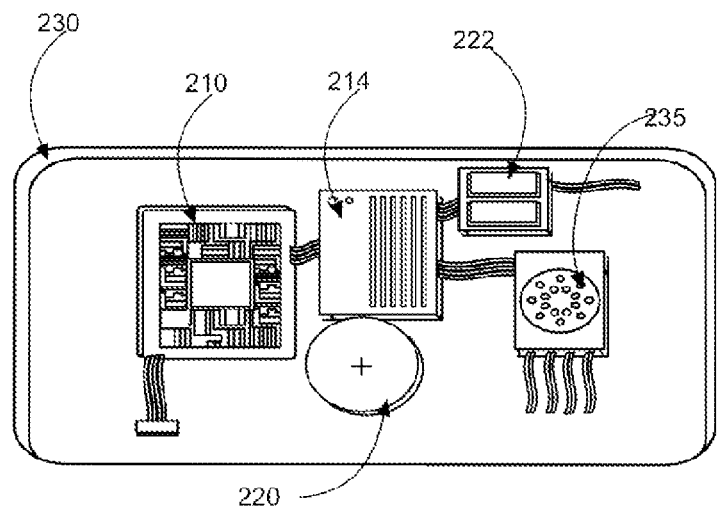
FIG. 3B is an interior-perspective view of the slave-tag assembly comprising the microcontroller, the tracking unit comprising the unique identifier, the wireless transmitter and transceiver, and the power source according to an embodiment of the present invention of FIG. 3A.

Referring now to FIGS. 3A and 3B, a perspective view illustrating 3" by 6" model 300 of slave-tag assembly 102 comprising housing 115 having the inconspicuous profile and having dimensions of approximately 3" by 6" according to an embodiment of the present invention of FIG. 1. As shown, slave-tag assembly 102 may comprise housing 115 having dimensions of approximately 3" by 6".

Referring now to FIG. 3B showing an interior-perspective view of slave-tag assembly 102 comprising microcontroller 210, tracking unit 220 comprising unique identifier 205, wireless transmitter and transceiver 214, and power source 235 according to an embodiment of the present invention of FIG. 3A. Microcontroller 210, tracking unit 220 comprising unique identifier 205, wireless transmitter and transceiver 214, and power source 235 of 3" by 6" model 300 may be securely mounted inside an interior volume of housing 115. Microcontroller 210 may be in wired communication with tracking unit 220, wireless transmitter and transceiver 214, and power source 235. Tracking unit 220 may be structured and arranged for detecting a precise location of slave-tag assembly 102 and communicating the precise location to microcontroller 210. Unique identifier 205 may comprise unique identification signal 180 for distinguishing slave-tag assembly 102 from another slave-tag assembly 102. Wireless transmitter and transceiver 214 may be structured and arranged to wirelessly transmit the precise location and unique identification signal 180 comprising unique identifier 205 to wireless communication unit 424 of master device 110. Power source 235 may provide operating power to slave-tag assembly 102.

Referring now to FIGS. 4A-4D showing a plurality of master devices 110 of object tracking and discovery fleet system 100 according to an embodiment of the present invention. FIG. 4A is a perspective view illustrating master device 110 comprising iFinder 405. FIG. 4B is a perspective view illustrating master device 110 of object tracking and discovery fleet system 100 comprising iFinder mini 410. FIG. 4C is a perspective view illustrating master device 110 of object tracking and discovery fleet system 100 comprising large iFinder 415. FIG. 4D is a perspective view illustrating master device 110 of object tracking and discovery fleet system 100 comprising iFinder watch 435.

With continued reference to FIGS. 4A-4D, master device 110 may comprise microprocessor 420 in wired communication with display screen 422, wireless communication unit 424, alarm and speaker unit 426, touch display 430, and power supplier 432. Display screen 422 may be useful for displaying the precise location of slave-tag assembly 102 via map application 460 of master device 110. Alarm and speaker unit 426 may be structured and arranged to emit alarm 120. Memory device 428 may be structured and arranged to store data file(s) useful for microprocessor 420 to control master device 110. Touch display 430 may be structured and arranged to allow user 140 to input programmable command(s) into master device 110 such that the programmable commands are received by microprocessor 420 to control master device 110. Power supplier 432 may be useful for providing operating power to master device 110.

During use, master device 110 may be able to transmit call signal 175 from wireless communication unit 424 to wireless transmitter and transceiver 214 for tracking and locating user-desired object 105 if misplaced by user 140. It should be appreciated that object tracking and discovery fleet system 100 may be useful for locating plurality of user-desired object(s) 105 via one or more master device(s) 110 as commanded by user 140 to save time and minimize stress involved in spending time looking for misplaced items of importance.

In the embodiment of the present invention of FIG. 4A, master device 110 may comprise iFinder 405, iFinder 405 may comprise a mobile electronic device, similar in appearance to a smartphone, useful for syncing, monitoring, tracking, and locating plurality of user-desired object(s) 105, each user-desired object 105 removably-attached to slave-tag assembly 102 that is distinct via housing-attacher 116.

In another embodiment of the present invention of FIG. 4B, master device 110 may comprise iFinder mini 410. iFinder mini 410 may comprise a smaller mobile electronic device useful for syncing, monitoring, tracking, and locating plurality of user-desired object(s) 105, each user-desired object 105 removably-attached to slave-tag assembly 102 that is distinct via housing-attacher 116. Preferably, iFinder mini 410 may comprise a keyring hole and ring for clipping to a keyring of user 140.

In still another embodiment of the present invention of FIG. 4C, master device 110 may comprise large iFinder 415. Large iFinder 415 may comprise a larger mobile electronic device, similar in appearance to a tablet, useful for syncing, monitoring, tracking, and locating plurality of user-desired object(s) 105, each user-desired object 105 removably-attached to slave-tag assembly 102 that is distinct via housing-attacher 116.

In yet another embodiment of the present invention of FIG. 4D, master device 110 may comprise iFinder watch 435. iFinder watch 435 may comprise a wrist-worn device useful for tracking and locating slave-tag assembly 102. iFinder watch 435, similar in appearance to a watch, may be useful for tracking objects in a convenient manner via the wrist-worn device which may be worn about a wrist of user 140. It should be noted the wrist-worn device may comprise an adjustable band for fitting various sized wrists. The adjustable band may be manufactured and distributed in a variety of colors and designs based on consumer appeal.

Further, master device 110 may comprise a user-provided mobile electronic device (such as a laptop computer, a smartphone, a tablet, or the like). In such a manner, a mobile device software application of object tracking and discovery fleet system 100 may be downloaded and installed onto the user-provided mobile communication device. The mobile device software application may be useful for syncing, monitoring, and tracking slave-tag assembly 102 using the user-provided mobile electronic device.

Figure 5:
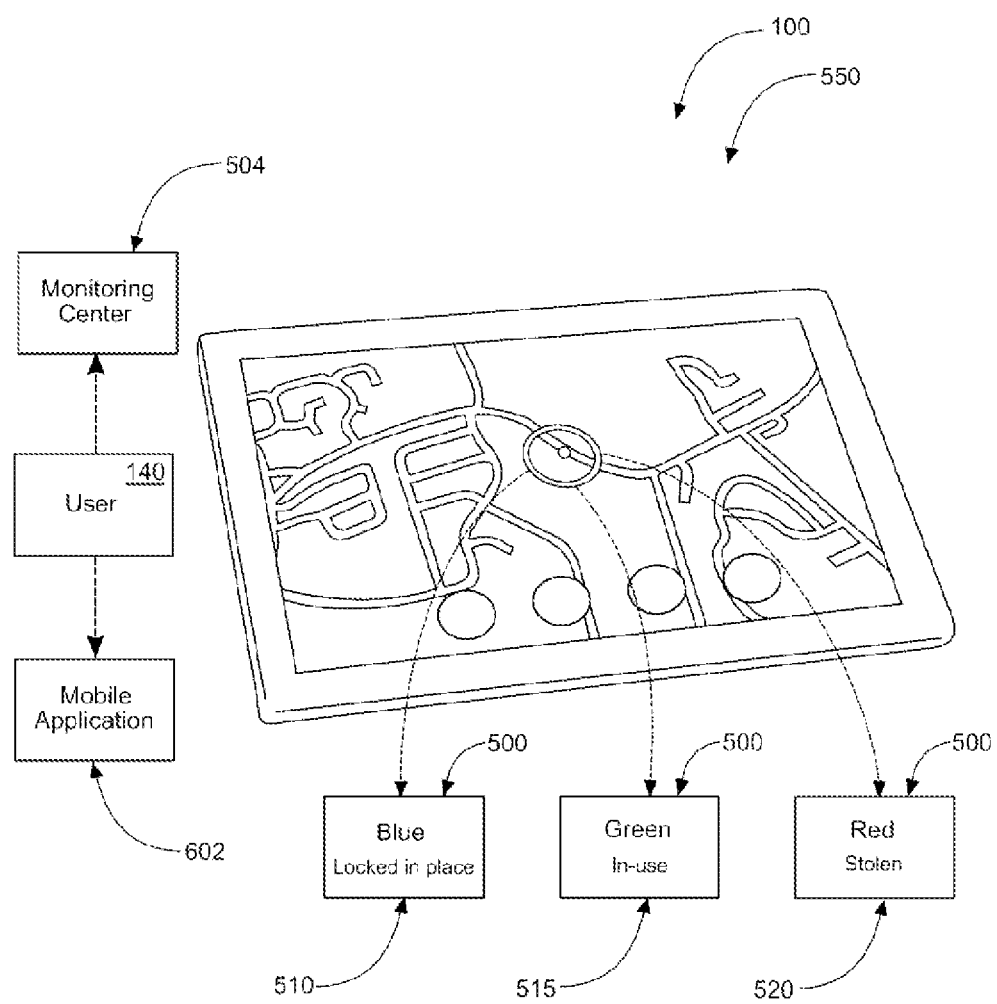
FIG. 5 is a perspective view illustrating the object tracking and discovery fleet system during an 'in-use' condition showing a color code useful for indicating a real-time status of the slave-tag assembly according to an embodiment of the present invention of FIG. 1.

Referring now to FIG. 5 is a perspective view illustrating the object tracking and discovery fleet system during 'in-use' condition 550 showing color code 505 useful for indicating a real-time status of slave-tag assembly 102 according to an embodiment of the present invention of FIG. 1. Color code 505 may be displayed on display screen 422 of master device 110 via a colored circle surrounding user-desired object 105 having slave-tag assembly 102 being actively tracked by user 140.

In continuing to refer to FIG. 5, color code 505 may comprise blue 510. Color code 505 comprising blue 510 may be useful for indicating the real-time status comprising a locked-secured condition of slave-tag assembly 102. Color code 505 may further comprise green 515 useful for indicating an in-use condition of slave-tag assembly 102. In addition, color code 505 may further comprise red 520 useful for indicating a stolen condition of slave-tag assembly 102.

Remote monitoring center 504 may comprise an around-the-clock real-time computer and/or human monitoring facility useful for providing a 24/7 phone and internet help center to assist user 140 in tracking and locating user-desired object(s) 105 having slave-tag assembly 102 attached thereto. It should be noted that user 140 is able create a user account with remote monitoring center 504 for real-time tracking of slave-tag assembly 102 belonging to user 140. Remote monitoring center 504 may be structured and arranged to receive a real-time communication from user 140 such that user 140 is able to communicate unique identifier 205 of slave-tag assembly 102 to remote monitoring center 504 for registering and tracking slave-tag assembly 102. The real-time communication may comprise a telephonic communication such that user 140 is able to telephonically communicate with remote monitoring center 504. Further, the real-time communication may comprise a wireless connection such that user 140 is able wirelessly communicate with remote monitoring center 504 via an Internet connection.

It should be noted that object tracking and discovery fleet system 100 may be sold as a kit comprising slave-tag assembly 102, master device 110 (such as iFinder 405, iFinder mini 4100, large iFinder 415, or iFinder watch 435), mobile device application software program 502, and a set of user instructions. The kit has instructions such that functional relationships are detailed in relation to the structure of the invention (such that the invention can be used, maintained, or the like in a preferred manner). Object tracking and discovery fleet system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 6:
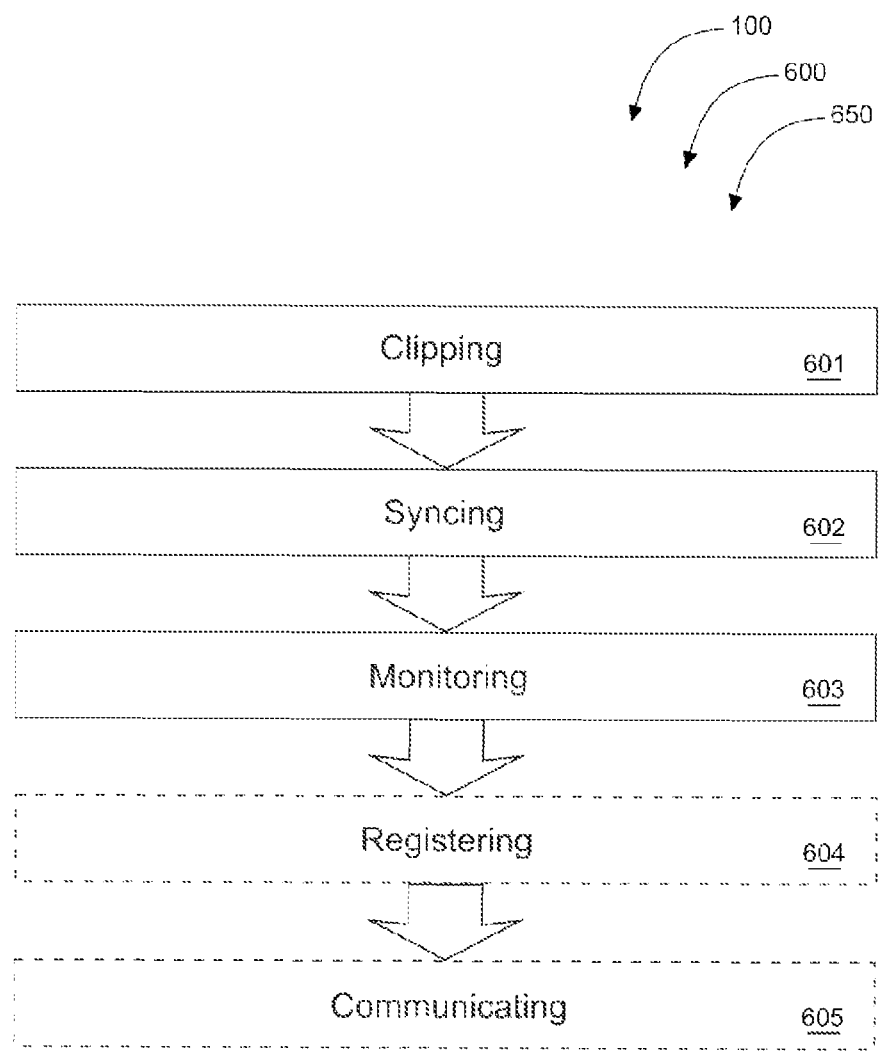
FIG. 6 is a flowchart illustrating a method of use for the object tracking and discovery fleet system according to an embodiment of the present invention of FIGS. 1-5.

Referring now to FIG. 6 is flowchart 650 illustrating method of use 600 for object tracking and discovery fleet system 100 according to an embodiment of the present invention of FIGS. 1-5. Method of use 600 for object tracking and discovery fleet system 100 comprises the steps of: step one 601, clipping housing 115 of slave-tag assembly 102 to user-desired object 105 via housing-attacher 116; step two 602, syncing unique identifier 205 of slave-tag assembly 102 with master device 110; and step three 603, monitoring slave-tag assembly 102 via master device 110.

Method of use 600 for object tracking and discovery fleet system 100 may comprise the optional steps of: step four 604, registering a user account with a remote monitoring center; and step five 605, communicating with remote monitoring center 504 to track and locate slave-tag assembly 102 during use.

It should be noted that steps 604 and 605 are optional steps and may not be implemented in all cases. Optional steps of method 600 are illustrated using dotted lines in FIG. 6 so as to distinguish them from the other steps of method 600.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An object tracking and discovery fleet system comprising:
   at least one slave-tag assembly comprising;
      a housing comprising an inconspicuous profile;
      at least one housing-attacher;
      at least one microcontroller;
      at least one tracking unit;
      a unique identifier;
      at least one wireless transmitter and transceiver, and
      at least one power source; and
   at least one master device comprising;
      a microprocessor;
      a display screen;
      a wireless communication unit;
      an alarm and speaker unit;
      at least one memory device;
      a map application;
      a plurality of control buttons; and
      at least one power supplier;
   wherein said at least one slave-tag assembly and said at least one master device comprises in functional combination said object tracking and discovery fleet system;
   wherein said at least one microcontroller, said at least one tracking unit, said unique identifier, said at least one wireless transmitter and transceiver, and said at least one power source are securely mounted inside an interior volume of said housing comprising said inconspicuous profile;
   wherein said at least one housing-attacher is useful for attaching said housing comprising said inconspicuous profile to a user-desired object;
   wherein said at least one microcontroller is in wired communication with said at least one tracking unit, said at least one wireless transmitter and transceiver, and said at least one power source;
   wherein said at least one tracking unit is structured and arranged for detecting a precise location of said at least one slave-tag assembly and communicating said precise location to said at least one microcontroller;
   wherein said unique identifier comprises a unique identification signal for distinguishing said at least one slave-tag assembly from another said at least one slave-tag assembly;
   wherein said at least one wireless transmitter and transceiver is structured and arranged to wirelessly transmit said precise location and said unique identification signal comprising said unique identifier to said wireless communication unit of said at least one master device;
   wherein said at least one power source provides operating power to said least one slave-tag assembly;
   wherein said microprocessor is in wired communication with said display screen, said wireless communication unit, said alarm and speaker unit, said plurality of control buttons, and said at least one power supplier;
   wherein said display screen is useful for displaying said precise location of said at least one slave-tag assembly via said map application;
   wherein said alarm and speaker unit is structured and arranged to emit an audible alarm;
   wherein said at least one memory device is structured and arranged to store at least one data file;
   wherein said touch display are structured and arranged to allow a user to input at least one programmable command, said at least one programmable command receivable by said microprocessor;
   wherein said at least one power supplier provides operating power to said at least one master device;
   wherein said at least one master device is able to transmit a call signal from said wireless communication unit to said at least one wireless transmitter and transceiver for tracking and locating said user-desired object if misplaced by said user; and
   wherein said object tracking and discovery fleet system is useful for locating a plurality of said user-desired trackable object(s) via said at least one master device as commanded by said user to save time and minimize stress.

2. The object tracking and discovery fleet system of claim 1 wherein said housing comprising said inconspicuous profile further comprises a hard, injection-molded plastic shell for protecting integral components of said at least one slave-tag assembly.

3. The object tracking and discovery fleet system of claim 2 wherein said at least one tracking unit comprises a global position satellite chip for pinpointing said precise location via said map application of said at least one master device.

4. The object tracking and discovery fleet system of claim 3 wherein said at least one slave-tag assembly further comprises an alarm, said alarm structured and arranged to emit a noise upon receipt of said call signal transmitted by said at least one master device.

5. The object tracking and discovery fleet system of claim 4 wherein said at least one slave-tag assembly further comprises at least one LED structured and arranged to pulsate upon receipt of said call signal transmitted by said at least one master device.

6. The object tracking and discovery fleet system of claim 1 wherein said housing of said at least one slave-tag assembly comprises dimensions of approximately 1" by 2" useful for clipping said housing onto said user-desired object having smaller dimensions.

7. The object tracking and discovery fleet system of claim 1 wherein said housing of said at least one slave-tag assembly comprises dimensions of approximately 3" by 6" useful for clipping said housing onto said user-desired object having larger dimensions.

8. The object tracking and discovery fleet system of claim 1 wherein said at least one master device comprises a wrist-worn device useful for tracking and locating said at least one slave-tag assembly.

9. The object tracking and discovery fleet system of claim 1 further comprising a mobile device software application downloadable onto at least one user-provided mobile communication device, said mobile device software application useful for syncing, monitoring, and tracking said at least one slave-tag assembly.

10. The object tracking and discovery fleet system of claim 1 further comprising a color code for indicating a real-time status of said at least one slave-tag assembly.

11. The object tracking and discovery fleet system of claim 10 wherein said color code comprises a blue color, said blue color useful for indicating said real-time status comprising a locked-secured condition of said at least one slave-tag assembly.

12. The object tracking and discovery fleet system of claim 10 wherein said color code comprises a green color, said green color useful for indicating said real-time status comprising an in-use condition of said at least one slave-tag assembly.

13. The object tracking and discovery fleet system of claim 10 wherein said color code comprises a red color, said red color useful for indicating said real-time status comprising a stolen condition of said at least one slave-tag assembly.

14. An object tracking and discovery fleet system comprising:
- at least one slave-tag assembly comprising;
  - a housing comprising an inconspicuous profile;
  - at least one housing-attacher;
  - at least one microcontroller;
  - at least one tracking unit;
  - a unique identifier;
  - at least one wireless transmitter and transceiver; and
  - at least one power source;
- at least one master device comprising;
  - a microprocessor;
  - a display screen;
  - a wireless communication unit;
  - an alarm and speaker unit;
  - at least one memory device;
  - a map application;
  - a plurality of control buttons; and
  - at least one power supplier; and
- a remote monitoring center in regular remote communication with said at least one slave-tag assembly and said at least one master device;

wherein said at least one slave-tag assembly, said at least one master device, and said remote monitoring center comprises in functional combination said object tracking and discovery fleet system;

wherein said at least one microcontroller, said at least one tracking unit, said unique identifier, said at least one wireless transmitter and transceiver, and said at least one power source are securely mounted inside an interior volume of said housing comprising said inconspicuous profile;

wherein said at least one housing-attacher is useful for attaching said housing comprising said inconspicuous profile to a user-desired object;

wherein said at least one microcontroller is in wired communication with said at least one tracking unit, said at least one wireless transmitter and transceiver, and said at least one power source;

wherein said at least one tracking unit is structured and arranged for detecting a precise location of said at least one slave-tag assembly and communicating said precise location to said at least one microcontroller;

wherein said unique identifier comprises a unique identification signal for distinguishing said at least one slave-tag assembly from another said at least one slave-tag assembly;

wherein said at least one wireless transmitter and transceiver is structured and arranged to wirelessly transmit said precise location and said unique identification signal comprising said unique identifier to said wireless communication unit of said at least one master device;

wherein said at least one power source provides operating power to said least one slave-tag assembly;

wherein said microprocessor is in wired communication with said display screen, said wireless communication unit, said alarm and speaker unit, said plurality of control buttons, and said at least one power supplier;

wherein said display screen is useful for displaying said precise location of said at least one slave-tag assembly via said map application;

wherein said alarm and speaker unit is structured and arranged to emit an audible alarm;

wherein said at least one memory device is structured and arranged to store at least one data file;

wherein said touch display are structured and arranged to allow a user to input at least one programmable command, said at least one programmable command receivable by said microprocessor;

wherein said at least one power supplier provides operating power to said at least one master device;

wherein said at least one master device is able to transmit a call signal from said wireless communication unit to said at least one wireless transmitter and transceiver for tracking and locating said user-desired object if misplaced by said user; and wherein said object tracking and discovery fleet system is useful for locating a plurality of said user-desired trackable object(s) via said at least one master device as commanded by said user to save time and minimize stress.

15. The object tracking and discovery fleet system of claim 14 wherein said user is able create a user account with said remote monitoring center for real-time tracking of said at least one slave-tag assembly(ies) belonging to said user.

16. The object tracking and discovery fleet system of claim 15 wherein said remote monitoring center is structured and arranged to receive a real-time communication from said user such that said user is able to communicate said unique identifier of said at least one slave-tag assembly to said remote monitoring center for registering and tracking said at least one slave-tag assembly(ies).

17. The object tracking and discovery fleet system of claim 16 wherein said real-time communication comprises a telephonic communication such that said user is able to telephonically communicate with said remote monitoring center.

18. The object tracking and discovery fleet system of claim 16 wherein said real-time communication comprises a wireless connection such that said user is able wirelessly communicate with said remote monitoring center.

* * * * *